United States Patent
Mirjalili et al.

(10) Patent No.: US 10,996,769 B2
(45) Date of Patent: May 4, 2021

(54) CONTACT LENS-BASED EYE TRACKING

(71) Applicant: Spy Eye, LLC, Los Gatos, CA (US)

(72) Inventors: Ramin Mirjalili, Milpitas, CA (US); Joseph Czompo, San Jose, CA (US); Jieyang Jia, Stanford, CA (US); Michael West Wiemer, San Jose, CA (US)

(73) Assignee: Tectus Corporation, Saratoga, CA (US)

(*) Notice: Subject to any disclaimer, the term of this patent is extended or adjusted under 35 U.S.C. 154(b) by 91 days.

(21) Appl. No.: 16/005,379

(22) Filed: Jun. 11, 2018

(65) Prior Publication Data

US 2019/0377428 A1  Dec. 12, 2019

(51) Int. Cl.
*G06F 3/0346* (2013.01)
*G06F 3/01* (2006.01)
*G02C 7/04* (2006.01)
*G02B 27/01* (2006.01)
*G03B 21/56* (2006.01)

(52) U.S. Cl.
CPC ......... *G06F 3/0346* (2013.01); *G02B 27/017* (2013.01); *G02C 7/04* (2013.01); *G03B 21/56* (2013.01); *G06F 3/013* (2013.01)

(58) Field of Classification Search
None
See application file for complete search history.

(56) References Cited

U.S. PATENT DOCUMENTS

| | | | |
|---|---|---|---|
| 5,467,104 A | 11/1995 | Furness, III et al. | |
| 5,682,210 A | 10/1997 | Weirich | |
| 6,427,079 B1 | 7/2002 | Schneider et al. | |
| 8,108,171 B2 | 1/2012 | Judd | |
| 8,632,182 B2 | 1/2014 | Chen et al. | |
| 8,786,675 B2 | 7/2014 | Deering | |
| 8,896,301 B2 | 11/2014 | Oka et al. | |
| 9,028,068 B2 | 5/2015 | Chang | |
| 9,040,923 B2 | 5/2015 | Sprague et al. | |
| 9,063,351 B1 | 6/2015 | Ho et al. | |
| 9,111,473 B1 | 8/2015 | Ho et al. | |

(Continued)

FOREIGN PATENT DOCUMENTS

EP  2295933 B1  10/2013

OTHER PUBLICATIONS

Chen et al., "Gyroscope Free Strapdown Inertial Measurement Unit by Six Linear Accelerometers," *AIAA Journal of Guidance, Control and Dynamics*, vol. 17, No. 2, Mar.-Apr. 1994, pp. 286-290.

(Continued)

*Primary Examiner* — Andre L Matthews
(74) *Attorney, Agent, or Firm* — Fenwick & West LLP

(57) ABSTRACT

In one approach to eye tracking, a contact lens contains a network of twelve accelerometers. The accelerometers are positioned within the contact lens so that the measurements of acceleration can be used to estimate a position and an orientation of the eye relative to an external reference frame. One advantage of accelerometers is that they can be made relatively small and do not require much power. However, because the contact lens has a curved shape and is relatively thin, the possible locations for the accelerometers are limited. Various geometries for the accelerometer network and approaches to optimizing these geometries are described.

19 Claims, 14 Drawing Sheets

(56) References Cited

U.S. PATENT DOCUMENTS

| | | | |
|---|---|---|---|
| 9,244,285 B2 | 1/2016 | Chen et al. | |
| 9,465,044 B2 | 10/2016 | Anderson | |
| 9,612,456 B1* | 4/2017 | Pugh | G02C 11/10 |
| 10,010,270 B2* | 7/2018 | Pletcher | A61B 3/10 |
| 10,932,965 B2* | 3/2021 | Moore | A61B 5/02055 |
| 2008/0042973 A1 | 2/2008 | Zhao et al. | |
| 2011/0098958 A1 | 4/2011 | Hirobe et al. | |
| 2011/0112805 A1 | 5/2011 | Lieberman | |
| 2011/0307213 A1 | 12/2011 | Zhao et al. | |
| 2012/0140167 A1* | 6/2012 | Blum | G02C 7/04 351/159.34 |
| 2013/0050432 A1 | 2/2013 | Perez et al. | |
| 2014/0085602 A1* | 3/2014 | Ho | A61B 5/4875 351/159.03 |
| 2014/0292620 A1 | 10/2014 | Lapstun | |
| 2015/0223684 A1 | 8/2015 | Hinton | |
| 2015/0227735 A1 | 8/2015 | Chappell | |
| 2015/0312560 A1* | 10/2015 | Deering | G02B 13/0085 345/1.3 |
| 2015/0362750 A1 | 12/2015 | Yeager et al. | |
| 2017/0086668 A1* | 3/2017 | Francois | A61B 3/113 |
| 2017/0112433 A1 | 4/2017 | Pugh | |
| 2017/0328931 A1 | 11/2017 | Zhang | |
| 2017/0371184 A1* | 12/2017 | Shtukater | G02C 11/10 |
| 2018/0144554 A1 | 5/2018 | Watola | |
| 2020/0064660 A1* | 2/2020 | Langford | G02C 7/041 |

OTHER PUBLICATIONS

Schopp et al., "Self-Calibration of Accelerometer Arrays," *IEEE Transactions on Instrumentation and Measurement*, vol. 65, No. 8, Aug. 2016, pp. 1913-1925.

Schopp et al., "Design, geometry evaluation, and calibration of a gyroscope-free inertial measurement unit," *Sensors and Actuators A* 162, pp. 379-387 (2010).

International Search Report and Written Opinion for Application No. PCT/US19/35640, dated Aug. 28, 2019, 15 pages.

* cited by examiner

US 10,996,769 B2

CONTACT LENS-BASED EYE TRACKING

BACKGROUND

1. Technical Field

This disclosure relates generally to eye tracking, for example as used for eye-mounted displays.

2. Description of Related Art

An eye-mounted display has been proposed by Deering. See, e.g. U.S. Pat. No. 8,786,675, "Systems using eye mounted displays." One type of eye-mounted display is based on a tiny projector mounted inside a contact lens. The projector projects images onto the retina of a person wearing the contact lens. The projector must be very small to fit in the contact lens, so small that, for convenience, Deering called it a "femtoprojector." A typical femtoprojector preferably is no larger than about one or two millimeters in any dimension.

Eye-mounted displays can be used for virtual reality applications and also for augmented reality applications. In virtual reality applications, the images projected by the eye-mounted display replace the user's view of his external environment. In augmented reality applications, the images projected by the eye-mounted display augment the user's view of his external environment. For example, the projected images may appear superimposed on the user's external environment.

Virtual reality and augmented reality systems may include eye tracking components that track the position and/or orientation of the eye. However, conventional eye tracking components may be large, including both mounted on the user's head and external to the user. This can make the overall system cumbersome and can also degrade the user experience. Eye tracking can also be used for many applications other than augmented reality and virtual reality. However, the large size of conventional eye tracking systems is also a drawback for many of these other applications.

BRIEF DESCRIPTION OF THE DRAWINGS

Embodiments of the disclosure have other advantages and features which will be more readily apparent from the following detailed description and the appended claims, when taken in conjunction with the examples in the accompanying drawings, in which:

DETAILED DESCRIPTION OF THE PREFERRED EMBODIMENTS

Figure 1A:
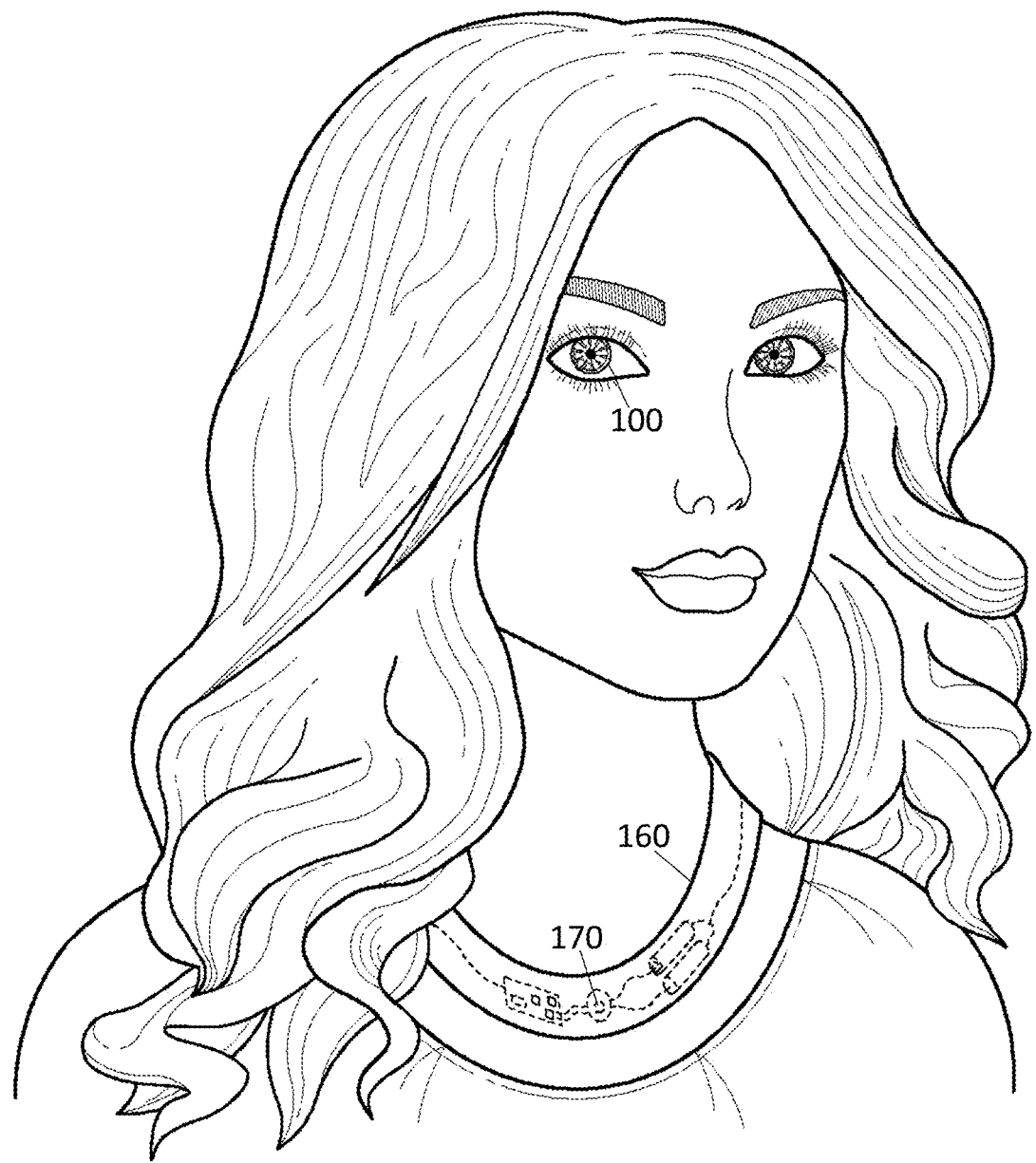
FIG. 1A shows a user wearing an eye-mounted display in communication with an auxiliary necklace.

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

In one aspect, an eye-mounted display includes a contact lens and one or more very small projectors (referred to as femtoprojectors) contained inside the contact lens. The femtoprojectors project images onto a user's retina. Because the display is eye-mounted, the femtoprojectors move with the eye. An eye-mounted display, such as a contact lens with femtoprojector(s) in it, differs from a conventional head mounted display (fixed to a helmet or goggles, for example), a mobile device display, a computer monitor or a television. An eye-mounted display is fixed in relation to a wearer's eyeball and moves with the eyeball. Other kinds of displays do not move with eyeball motion.

This means that if a static image is presented on an eye-mounted display in the middle of a wearer's field of view, the image remains in the middle of the field of view no matter where the wearer looks. If the wearer looks to the right or left toward an external area of interest, this eye movement does not change the location of the image on the retina. The image will remain in the middle of the wearer's field of view. However, the eye movement does change where the wearer is looking in the external environment, so the static image will appear to move relative to the external environment. In order for the projected image to appear to be stationary relative to an external environment, the movement of the eye must be compensated for. Eye tracking may be used for this purpose. For example, if eye tracking indicates that the eye is now viewing to the right, then the position of the projected image may be adjusted so that it appears to the left in the eye's field of view, which would make it appear to be stationary relative to the external environment.

Eye tracking may also be used for many other applications, for example concussion monitoring, sleep studies, sports performance, and brain research. In many cases, it is desirable for the eye tracking components to be small and unobtrusive. This can enhance the overall user experience and the accuracy of eye motion monitoring, compared to wearing bulky eye tracking components.

In one approach to eye tracking, a contact lens contains a network of twelve accelerometers. The accelerometers are positioned within the contact lens so that the measurements of acceleration can be used to estimate the position and/or orientation of the eye relative to a frame of reference. One advantage of accelerometers is that they can be made very small and require very little power, including smaller size and lower power than gyroscopes. However, because the accelerometers are positioned inside a contact lens that has a curved shape and is relatively thin, the possible locations for the accelerometers are limited. It is not possible to position the accelerometers according to known optimal geometries, such as at the vertices of an equilateral tetrahedron (i.e., a tetrahedron where each face is an equilateral triangle). Various geometries for the accelerometer network and approaches to optimizing these geometries are described below.

In one approach, the network of twelve accelerometers is implemented as four 3-axis accelerometers arranged in a non-planar geometry. One geometry is a shortened tetrahedron. Three of the 3-axis accelerometers are positioned at a radius $r_1$ from the center of a contact lens, for example at the maximum available radius. The fourth 3-axis accelerometer is positioned at the center of the contact lens. As an alternative, the fourth 3-axis accelerometer is positioned not at the center but at a radius $r_2 < r_1$. In that case, the other three 3-axis accelerometers may not be evenly spaced apart by 120 degrees. In another geometry, two of the 3-axis accelerometers are positioned at a radius $r_1$ and the other two 3-axis accelerometers are positioned at a radius $r_2 < r_1$.

In yet another approach, the twelve accelerometers are implemented as six 2-axis accelerometers arranged in a non-planar geometry. The 2-axis accelerometers are oriented so that, for some of the accelerometers, at least one axis of the two measures acceleration along a direction that is not tangential to a curvature of the contact lens. In addition, the two axes of each 2-axis accelerometer define a plane. The six 2-axis accelerometers therefore define six of these planes, and these planes are selected so that no three of the planes are all parallel to each other.

Details about specific designs are described below in the context of an eye-mounted display, although eye tracking is not limited to this particular application.

Figure 1B:
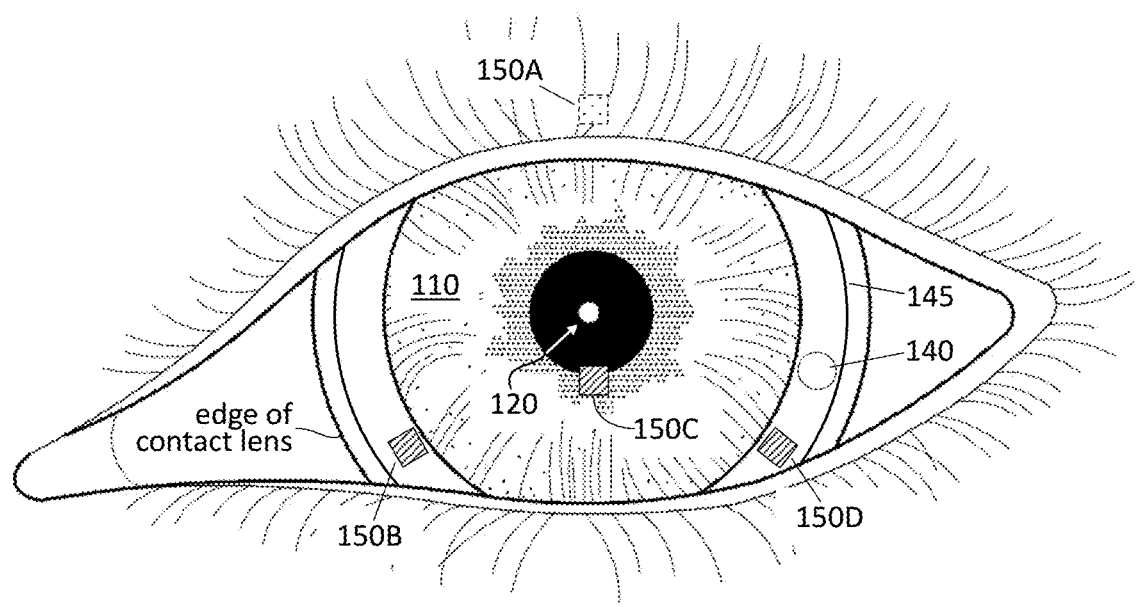
FIG. 1B shows a magnified view of the eye-mounted display mounted on the user's eye.

FIG. 1A shows a user wearing an eye-mounted display 100 in communication with a necklace 160. FIG. 1B shows a magnified view of the user's eye and eye-mounted display 100. The eye-mounted display 100 includes a contact lens 110 that is worn on the surface of the eye. The following examples use a scleral contact lens but the contact lens does not have to be scleral. The contact lens 110 contains one or more femtoprojectors 120, shown as a white dot in FIG. 1B. The femtoprojectors 120 project images onto the user's retina.

The contact lens 110 moves with the user's eye 100 as the user's eye rotates in its socket. Because the femtoprojectors 120 are mounted in the contact lens 110, they also move with the user's eye and generally project to the same region of the retina. Some femtoprojectors may always project images to the fovea, and other femtoprojectors may always project images to more peripheral regions which have lower resolutions.

In this example, the contact lens 110 also contains a separate electronics module 140 and a coil or antenna 145. Electrical interconnects between different components in the contact lens 110 are omitted for clarity. In some embodiments, the coil 145 is a power coil that receives power wirelessly, for example via magnetic induction. In other embodiments, the contact lens 110 includes a battery that supplies power to the components in the lens. The electronics 140 may be used to control the femtoprojectors, receive or process images from the femtoprojectors, provide power to the femtoprojectors, and/or transmit data to/from the femtoprojectors. The contact lens 110 may also include other components.

In FIG. 1B, the contact lens 110 also contains a network of accelerometers 150. In this example, there are four 3-axis accelerometers 150A-D, each represented by a small square. The outlined square 150A is in a portion of the contact lens that is covered by the user's eyelid in FIG. 1B. The hatched squares 150B-D are accelerometers that are directly visible. This accelerometer network measures accelerations of various points along various directions. These measurements may be processed to estimate eye position and/or orientation.

FIG. 1A shows an implementation where, in addition to the eye-mounted display 100, the user is also wearing a necklace 160 that contains components of the eye-mounted display system. In this example, the necklace 160 includes a wireless transmitter 170 that transmits image data and/or power to the eye-mounted display 100. Image transmission to an eye-mounted display is subject to data rate constraints due to size and power consumption limitations of electronics in a contact lens.

As described above, the contact lens may also contain components for data transmission and/or power. Data transmission components may include antennae or optical/infrared photodetectors, data storage and buffering, controls, and possibly also on-lens processing. Power components may include coils for power transmission and batteries for power storage.

There are many ways in which the functionality for an eye-mounted display can be configured to create embodiments of eye-mounted display systems. Portions of these subsystems may be external to the user, while other portions may be worn by the user in the form of a headpiece or glasses. Components may also be worn on a belt, armband, wrist piece, necklace or other types of packs.

Figure 2:
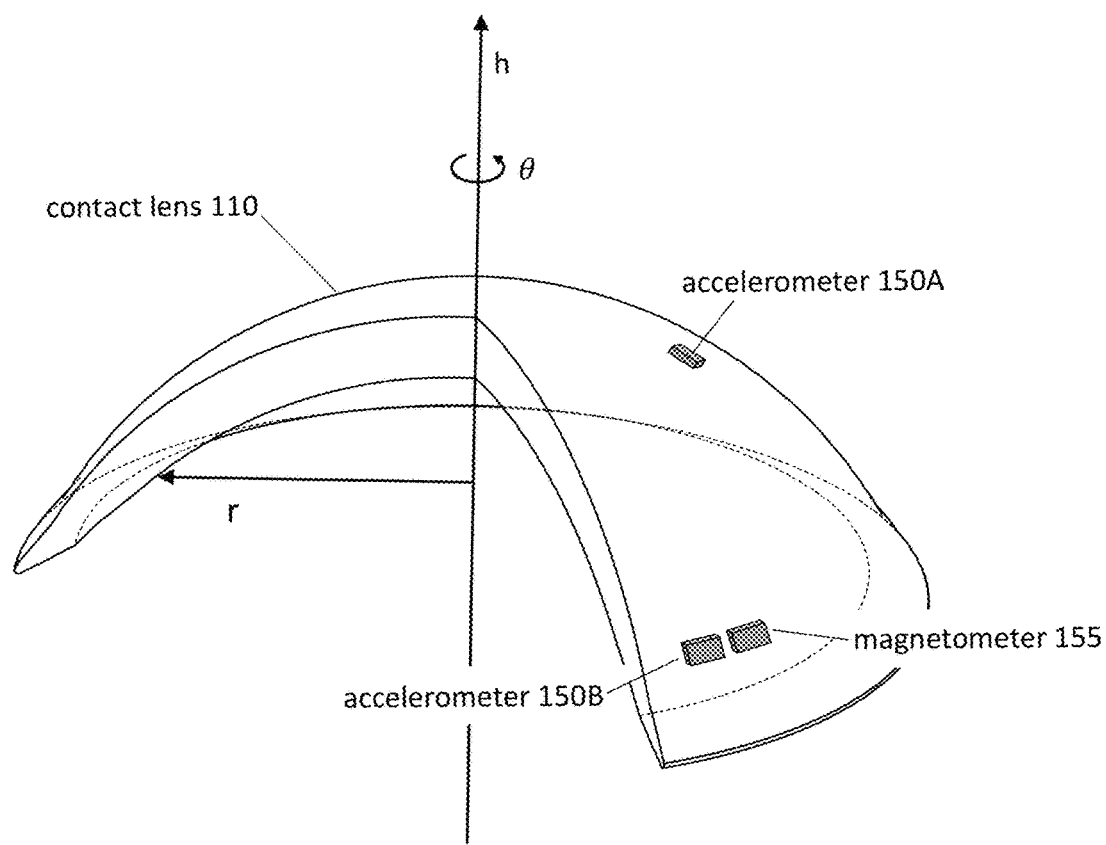
FIG. 2 shows a perspective view of a contact lens containing an accelerometer network and a magnetometer.

FIG. 2 shows a perspective view of a contact lens 110 that contains a network of accelerometers 150 and a magnetometer 155. The figure is drawn as a cut-away view for ease of comprehension. The accelerometers measure acceleration. They can be implemented as 1-, 2- or 3-axis accelerometers. A 1-axis accelerometer measures acceleration along only one direction, a 2-axis accelerometer measures the accelerations along two different directions, and a 3-axis accelerometer measures the accelerations along three different directions. The three accelerometers in a 3-axis accelerometer may be oriented in any convenient orientation (so long as the orientations are different), because acceleration measurements along any three axes (x,y,z) can be transformed to accelerations along any other three axes (x',y',z') by applying a coordinate transformation. Magnetometer 155 measures the direction of a magnetic field, such as the earth's magnetic field or an artificially generated magnetic field.

In the following description, the positions of the accelerometers 150 and magnetometers 155 are specified using a cylindrical coordinate system $(r, \theta, h)$, as shown in FIG. 2. Here, "r" is the radius or radial position, "$\theta$" is the azimuth or azimuthal angle, and "h" is the height or elevation. Note that the accelerometers 150 cannot be located at any arbitrary position $(r, \theta, h)$, due to the shape of the contact lens 110. Rather, the accelerometers 150 are contained within the contact lens 110. The contact lens 110 has approximately the shape of a section of a spherical shell, with a radius of curvature of approximately 8 to 12 mm and a thickness of approximately 0.5 to 1.5 mm. The shape deviates from a sphere for larger values of r, because the contact lens transitions from the portion that is over the cornea to the portion that is fitted to the sclera. The accelerometers are contained within this shell. Due to this shape, it is somewhat difficult to position accelerometers so that they are separated in height, h.

Terms such as "up", "down", "right" and "left" are used, but relative to FIGS. 1A-1B rather than FIG. 2. That is, "up" refers to the direction that is "up" in FIGS. 1A and 1B (towards the top of the user's head), and not to the "+h" direction in FIG. 2.

Figure 3:
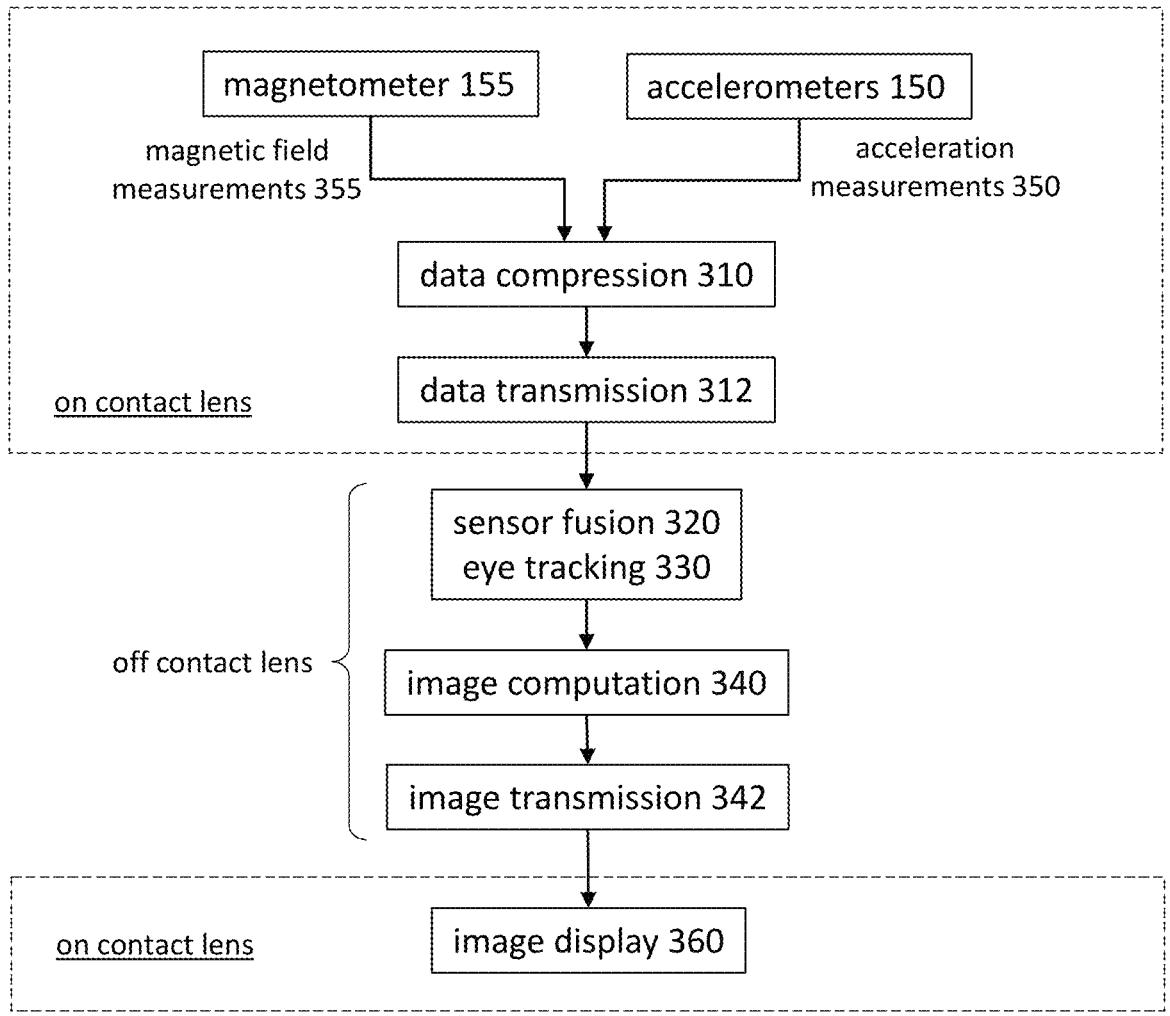
FIG. 3 shows a flow diagram for projecting images from an eye-mounted display with eye tracking.

FIG. 3 shows a flow diagram for projecting images from an eye-mounted display with eye tracking. The accelerometer network 150 measures accelerations 350 at different known points on the contact lens. The magnetometer(s) 155 measures the magnetic field 355 at a known point(s) on the contact lens. This may be the earth's magnetic field or an artificially generated magnetic field. These measurements 350, 355 are taken on-lens (i.e., within the contact lens), because the corresponding sensors are on-lens. The measurement data may be compressed 310 and then transmitted 312 off-lens, for example to components in the necklace 160. Other types of pre-processing may also occur on-lens before transmission 312 off-lens. Examples include smoothing, averaging and filtering of data; data cleaning and other types of sanity checking of data; processing to generate a virtual inertial measurement unit (equivalent of accelerometers plus gyroscope); and calculation of differential or differences over time, such as velocity change, position change, and orientation change.

An off-lens processor receives the measurements and estimates 330 the position and/or orientation of the eye. Data from other sensors can be used in combination 320 with the accelerometer and magnetometer measurements 350, 355 to achieve or improve the eye tracking. Kalman filtering may be used in the sensor fusion 320. The image to be displayed is computed 340, taking into account the eye's motion. It is then transmitted 342 to the eye-mounted display. For example, the eye motion may be used to maintain the projected image at a stationary location relative to the external environment. The image is then displayed 360 by the femtoprojector(s) in the contact lens.

In one approach, eye motion is estimated based on the acceleration measurements taken by a network of 12 accelerometers in the contact lens. The 12 acceleration measurements can be used to solve for the acceleration, angular velocity and angular acceleration of the contact lens: $\vec{a}$, $\vec{\omega}$, and $\vec{\dot{\omega}}$. The three vectors have three components each (in x, y and z), for a total of nine scalar variables. However, the angular velocity appears only in quadratic form (e.g. $\omega_x\omega_y$ or $\omega_x^2$, rather than just $\omega_x$ or $\omega_y$), and there are six of these quadratic terms rather than three linear terms, for a total of twelve terms in this system of equations.

The 12-accelerometer network is equivalent to one three-axis accelerometer and one three-axis gyroscope, i.e. an inertial measurement unit or IMU. IMUs use a reference to provide a starting condition and to counteract drift. If the IMU is not accelerating (or at least not too much or too often), then the direction of the Earth's gravity provides one reference axis, in the −z direction pointing towards the center of the Earth, that may be used to calibrate pitch and roll. One more axis is used to calibrate yaw. The magnetometer senses the Earth's magnetic field which provides this additional reference axis. For convenience, the following descriptions focus on just the accelerometer network.

Figure 4A:
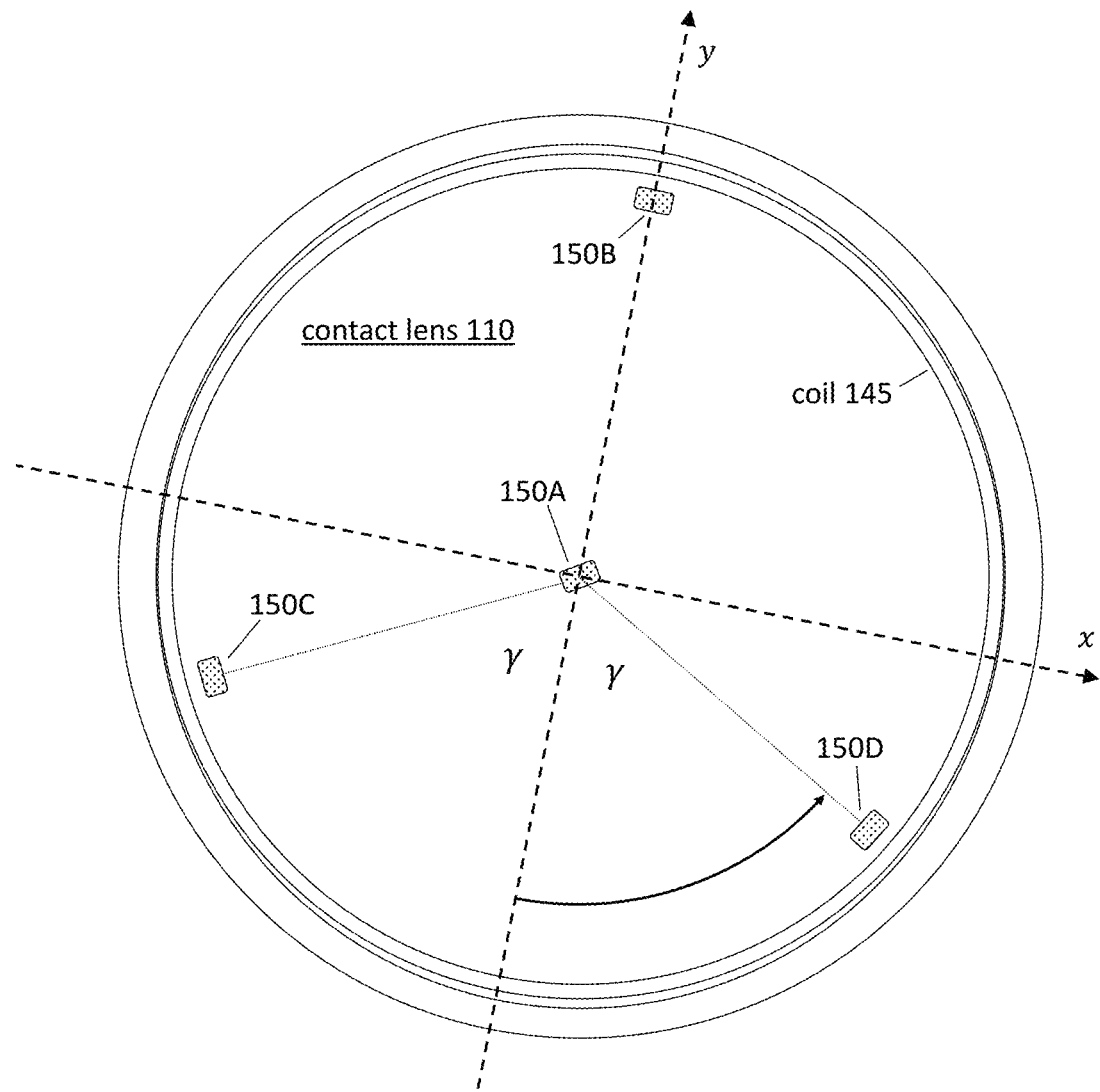
FIG. 4A shows a plan view of a contact lens containing four 3-axis accelerometers, with one accelerometer in the center of the contact lens.

FIG. 4A shows a plan view of a contact lens 110 containing four 3-axis accelerometers 150A-D. 3-axis accelerometers are available from various MEMS sensor manufacturers such as mCube. They may be approximately 1.1 mm×1.3 mm×0.55 mm in size and consume approximately 5 µW of power at an update rate of 100 Hz in low power mode. The equivalent measurement noise is approximately $$650 \frac{\mu g}{\sqrt{Hz}}.$$

This is just one example accelerometer.

One accelerometer 150A is in the center of the contact lens. The other three accelerometers 150B-D are distributed around an outside perimeter of the contact lens at a maximum radius of approximately 5-8 mm. This arrangement yields the maximum difference in height between accelerometers, which is approximately 4-6 mm. Two of the accelerometers 150A and 150B define a y-axis, as shown in the figure, and the other two accelerometers 150C-D are symmetrically located to either side of the y-axis and offset by an angle γ. In FIG. 4A, accelerometer 150D is offset from the y-axis by the angle +γ, and accelerometer 150C is offset from the y-axis by angle −γ.

The x- and y-axes shown in this and other figures may be aligned with right-left or up-down directions. Here, the y-axis may be aligned to the vertical direction or the x-axis may be aligned to the vertical direction. The vertical direction is the up-down direction in FIG. 1. It is the "vertical" direction for a wearer that is standing or who otherwise carries his head in a normal erect position.

Figure 4B:
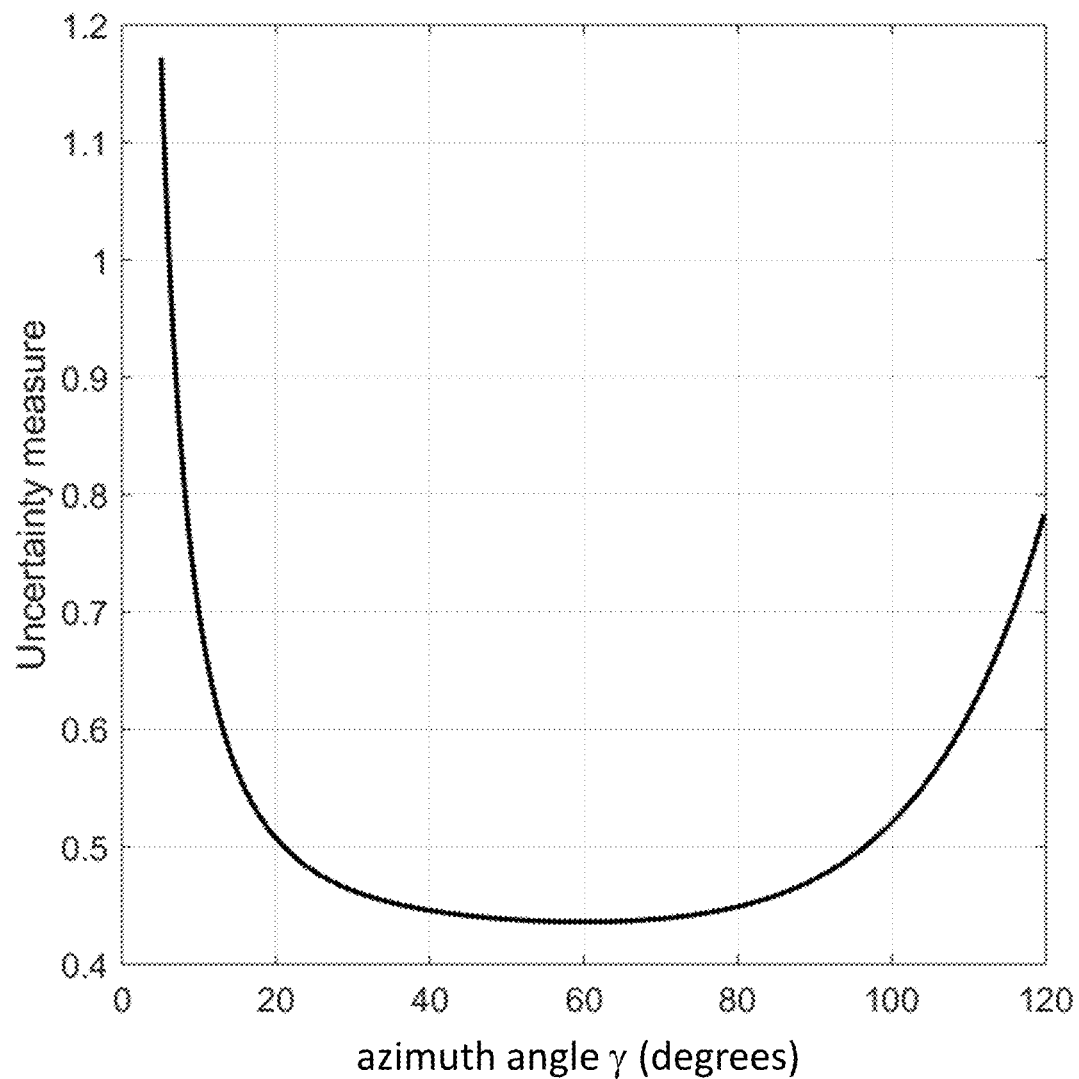
FIG. 4B shows a graph of measurement uncertainty as a function of azimuth angle γ for the accelerometer network of FIG. 4A.

FIG. 4B shows a graph of measurement uncertainty as a function of azimuth angle γ for the accelerometer network of FIG. 4A. The uncertainty measure used in this example is the sum of the variances of the estimated components of angular velocity, angular acceleration and acceleration:

$$Tr(\sigma) = \sigma_{\omega_x}^2 + \sigma_{\omega_y}^2 + \ldots + \sigma_{\dot{\omega}_x}^2 + \sigma_{\dot{\omega}_y}^2 + \ldots + \sigma_{a_x}^2 + \sigma_{a_y}^2 + \ldots \quad (1)$$

Here, $\sigma_x^2$ is the variance of the quantity X. The different quantities X are the x-, y- and z-components of the angular velocity $\vec{\omega}$, angular acceleration $\vec{\dot{\omega}}$ and acceleration $\vec{a}$. The 12-accelerometer network provides sensor measurements which are input to a Kalman filter (or other filters including recursive Bayesian estimators). The filter produces not only an acceleration and orientation estimate, but also the covariance matrix for the estimate. The "uncertainty measure" of Eqn. 1 is the sum of the variances of the estimated angular velocity, angular acceleration, and acceleration. This is also equal to the trace of the covariance matrix Tr(σ). In FIG. 4B, it is calculated for different values of the azimuth angle γ, while keeping other parameters the same.

The minimum uncertainty occurs for γ=60 degrees, which is when the three outer accelerometers 150B-D are evenly distributed around the perimeter. In addition, FIG. 4B shows that this configuration is relatively insensitive to γ. The uncertainty measure is relatively flat for values of γ ranging from 40 to 80 degrees.

Figure 5A:
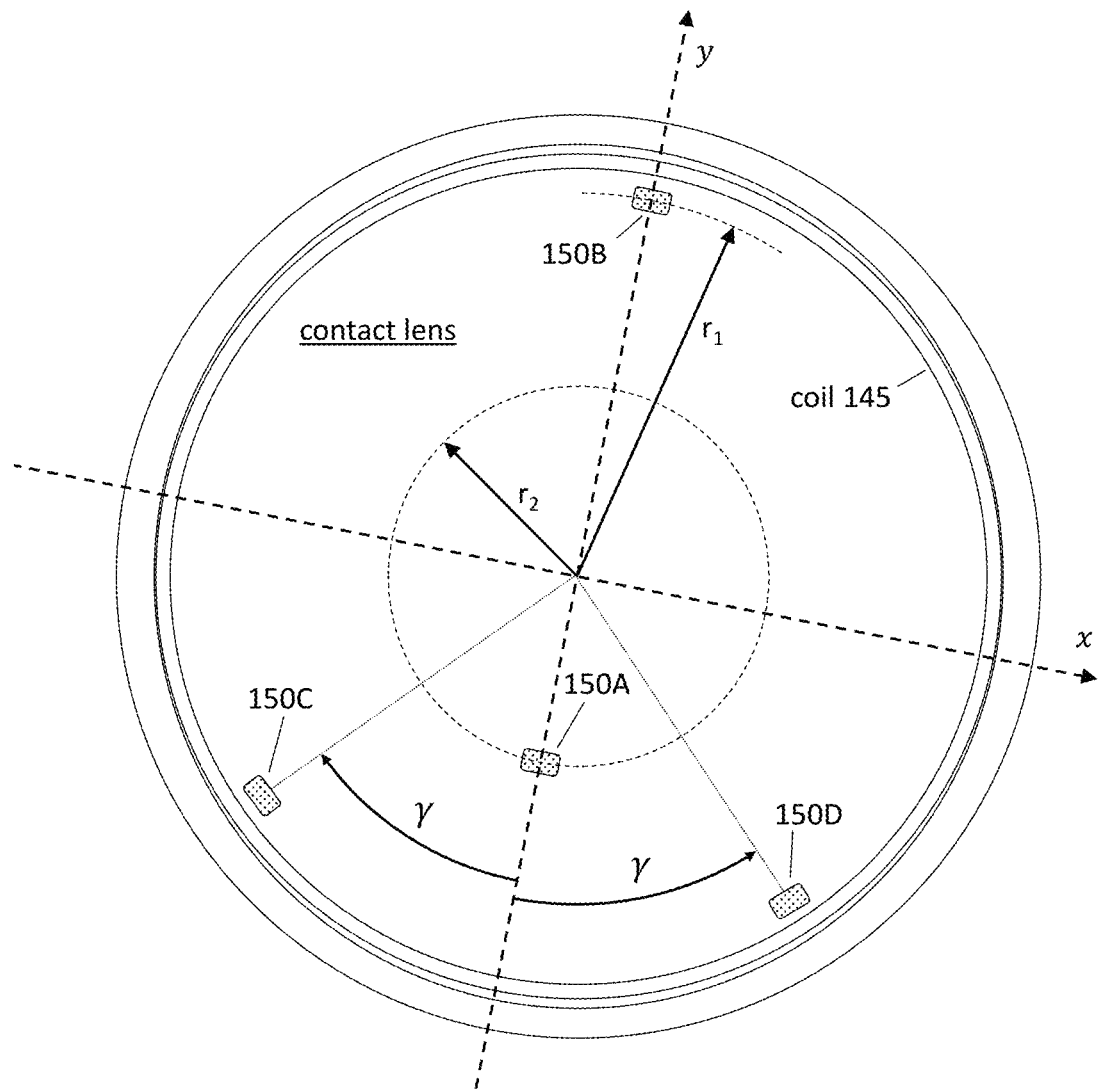
FIG. 5A shows a plan view of a contact lens containing four 3-axis accelerometers, with one accelerometer off-center in the contact lens.

FIG. 5A shows a plan view of a contact lens 110 containing four 3-axis accelerometers 150, with one accelerometer off-center in the contact lens. This configuration is similar to the one shown in FIG. 4A, except that accelerometer 150A is no longer at the center of the contact lens.

The accelerometer 150A is moved off-center, for example to reduce interference with other components in the contact lens. In this example, the accelerometer 150A is located at radius $r_2$ of approximately 2-3 mm. The other three accelerometers are located at the maximum radius $r_1$ of approximately 5-8 mm. The height difference is reduced to approximately 2-3 mm. Accelerometers 150A and 150B are both located on the y-axis, with accelerometer 150B located at $y=+r_1$ on the y-axis and accelerometer 150A located at $y=-r_2$ on the y-axis.

Figure 5B:
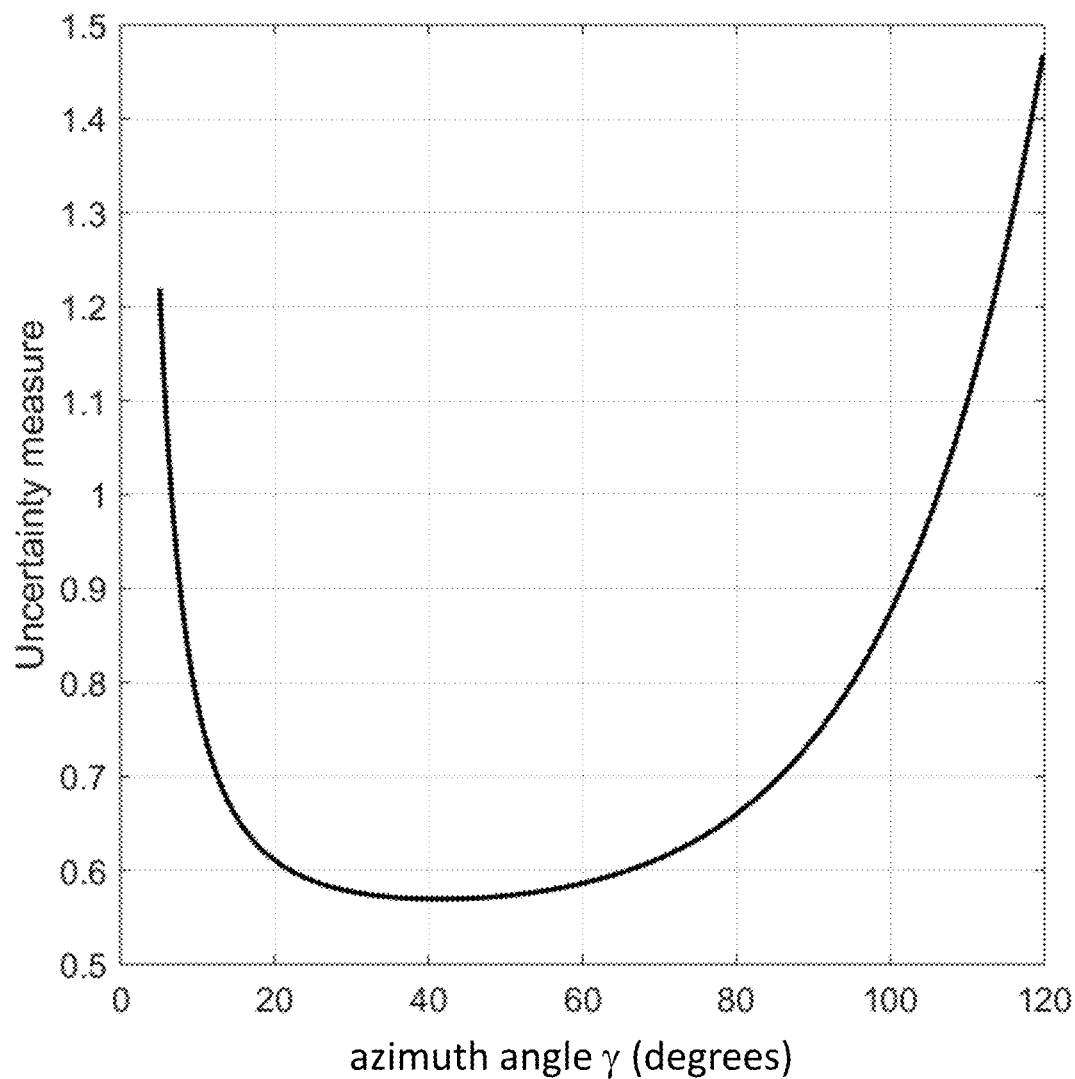
FIG. 5B shows a graph of measurement uncertainty as a function of azimuth angle γ for the accelerometer network of FIG. 5A.

FIG. 5B shows a graph of measurement uncertainty as a function of azimuth angle γ for the accelerometer network of FIG. 5A. The minimum uncertainty occurs for γ=41 degrees, with a fairly flat performance for values of γ ranging from 25 to 60 degrees. Interestingly, the three perimeter accelerometers 150B-D are not evenly spaced. Rather, the two accelerometers 150C and 150D are shifted inwards toward the off-center accelerometer 150A (i.e., γ<60 degrees). For the configuration of FIG. 5, the y-axis may be aligned vertically, horizontally, or in other directions depending on the application.

Figure 6A:
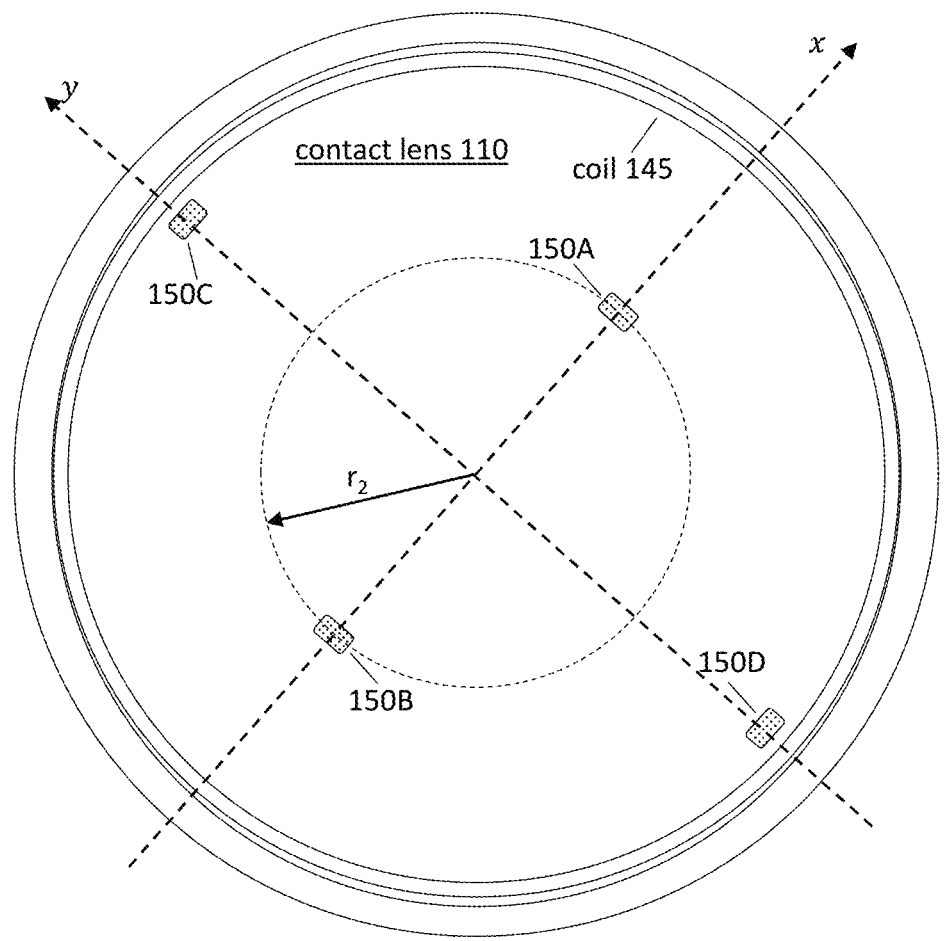
FIG. 6A shows a plan view of a contact lens containing four 3-axis accelerometers arranged in a tetrahedral configuration.

FIG. 6A shows a plan view of a contact lens containing four 3-axis accelerometers arranged in a tetrahedral configuration. The two accelerometers 150A,B are located at a radius $r_2$, and the two accelerometers 150C,D are located on the perimeter at radius $r_1$ of approximately 5-8 mm. The two sets of accelerometers are aligned orthogonal to each other. That is, the two accelerometers 150A,B are azimuthally offset by 90 degrees from the two accelerometers 150C,D. Either the x-axis or the y-axis may be aligned to vertical.

Figure 6B:
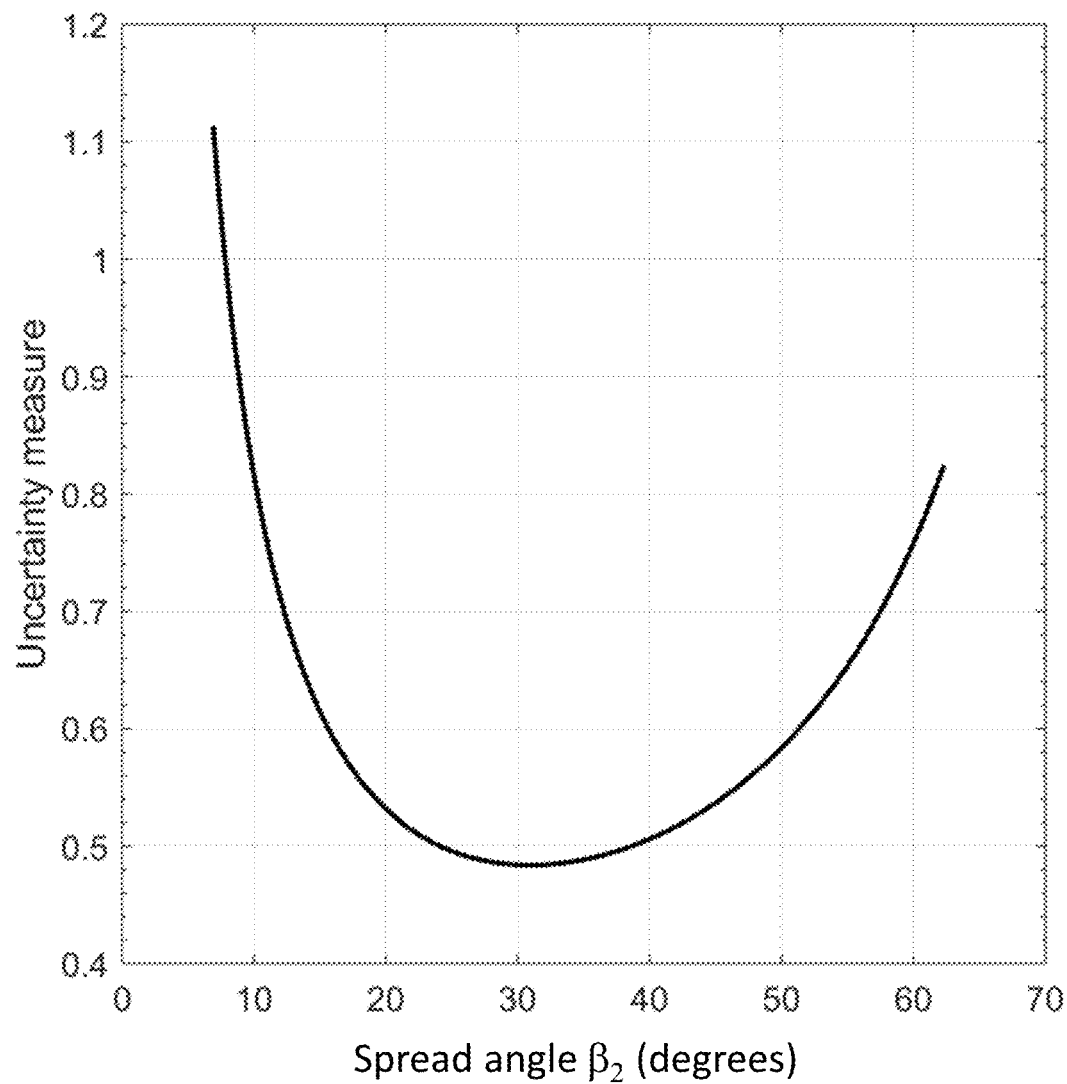
FIG. 6B shows a graph of measurement uncertainty as a function of radial position for the accelerometer network of FIG. 6A.
Figure 6C:
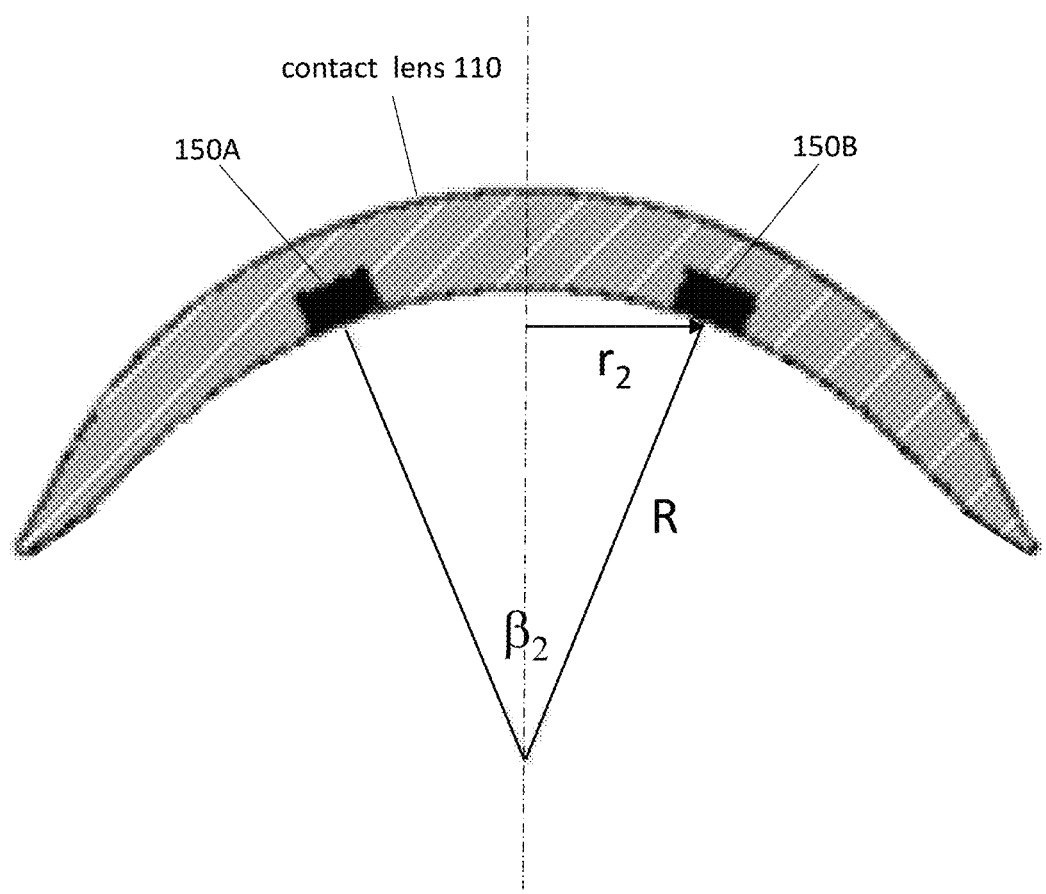
FIG. 6C shows a cross-section view of the contact lens of FIG. 6A.

FIG. 6B shows a graph of measurement uncertainty as a function of the spread angle $\beta_2$. FIG. 6C illustrates the relationship between the spread angle $\beta_2$ and the radius $r_2$. FIG. 6C shows a cross-section view of the contact lens of FIG. 6A taken through the two accelerometers 150A-B. The spread angle $\beta_2$ is the angle formed by the normals to the two accelerometers 150A-B. If the contact lens were perfectly spherical with radius R, then $r_2 = R \sin \beta_2/2$. At high values of $\beta_2$ or $r_2$, the height difference between the four accelerometers is reduced. At low values of $\beta_2$ or $r_2$, there is more height difference but the two accelerometers 150A,B are laterally closer to each other. The intermediate value of $r_2$ is approximately 2.5 mm is the optimal value because it balances this tradeoff.

Figure 7A:
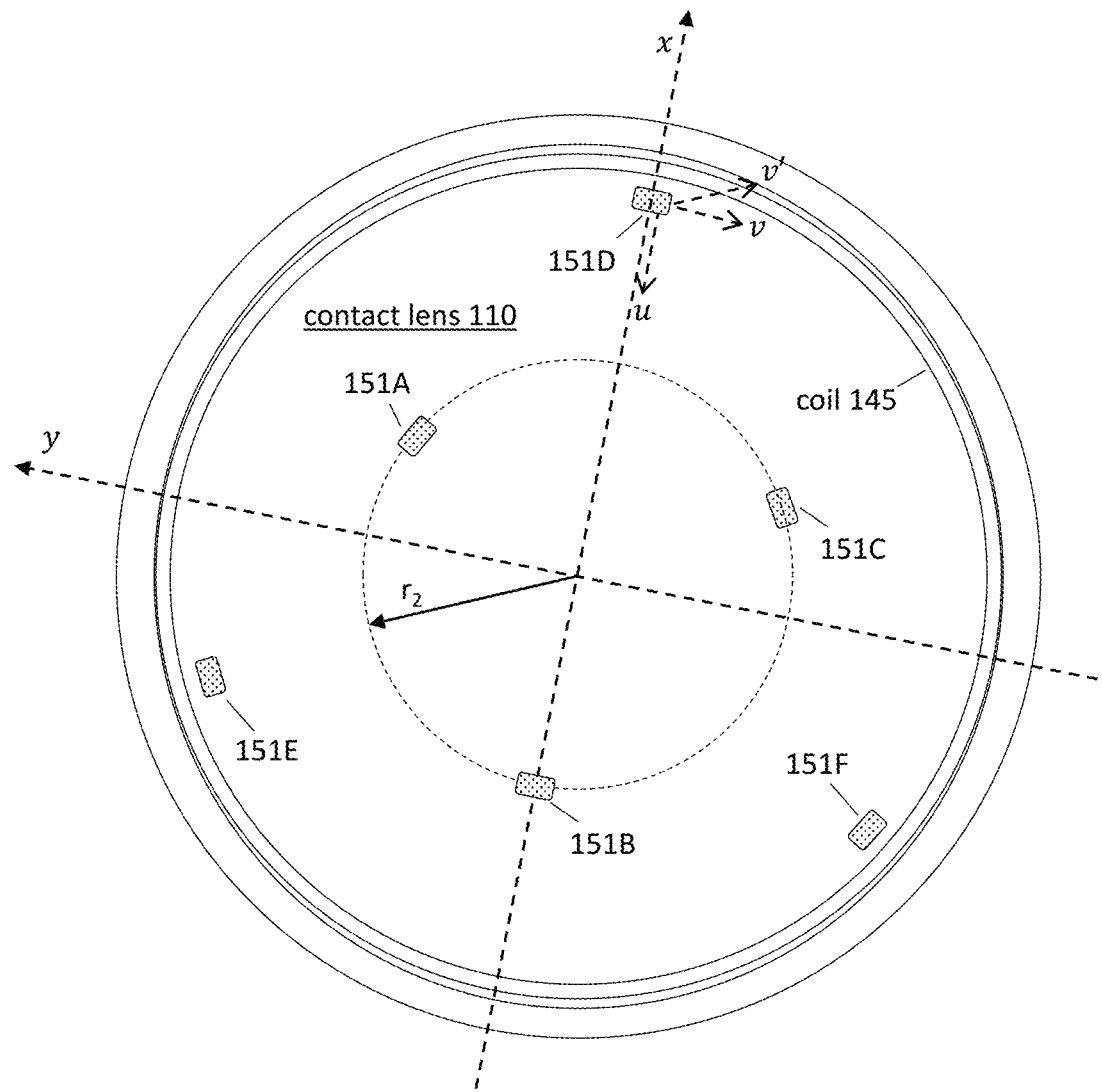
FIG. 7A shows a plan view of a contact lens containing six 2-axis accelerometers.

FIG. 7A shows a plan view of a contact lens containing six 2-axis accelerometers 151A-F. Three accelerometers 151A-C are located at a radius $r_2$, and the other three accelerometers 151D-F are located on the perimeter at radius $r_1$ of approximately 5-8 mm. The accelerometers are evenly distributed in azimuth in this example. Accelerometers 151D-F are located at θ=0, 120 and 240 degrees, while accelerometers 151A-C are located at θ=60, 180 and 300 degrees. In this analysis, two degrees of freedom are considered. One is the radius $r_2$, as measured by the spread angle $\beta_2$.

The other degree of freedom is the orientation of the axes of the 2-axis accelerometers. In FIG. 7A, the axes u and v are tangential to the surface of the contact lens. The u-axis is tangential to the contact lens surface and oriented towards the center axis, while the v-axis is tangential to the contact lens surface and oriented along a radial direction. To add an additional degree of freedom, the v-axis for accelerometers 151D-F is permitted to be tilted out of plane by the angle α, as shown by the new axis v'. The v'-axis is still perpendicular to the u axis, but it has a component in the direction perpendicular to the contact lens surface. Accordingly, the angle α is referred to as the out-of-sphere angle.

Figure 7B:
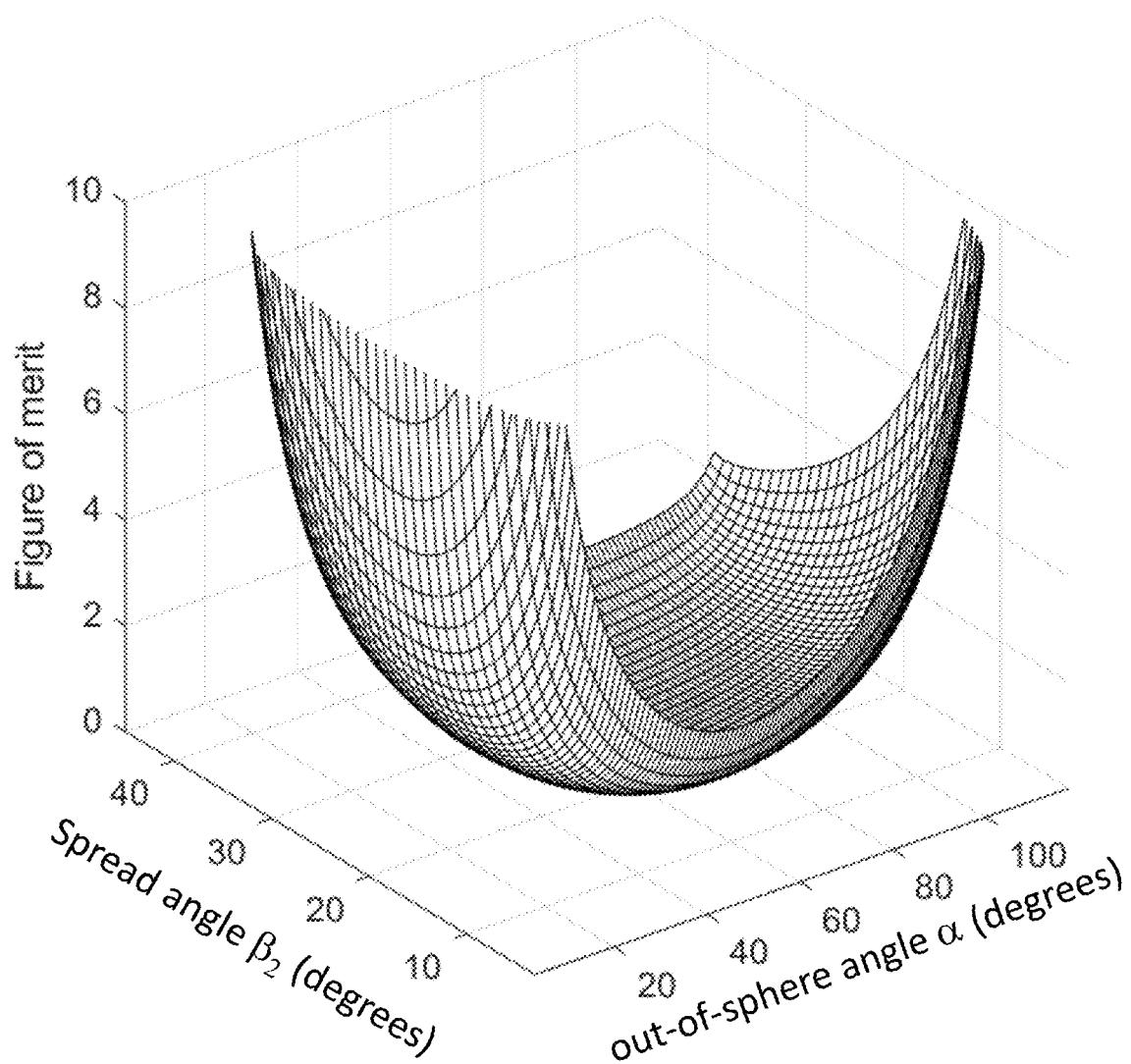
FIG. 7B shows a graph of measurement uncertainty as a function of radial position and accelerometer orientation for the accelerometer network of FIG. 7A.

FIG. 7B shows a graph of measurement uncertainty as a function of the spread angle $\beta_2$ and the out-of-sphere angle α. The least measurement uncertainty occurs at a of approximately 66 degrees. A value of α=66 degrees means that the second axis is closer to perpendicular to the contact lens surface than to tangential.

Figure 8:
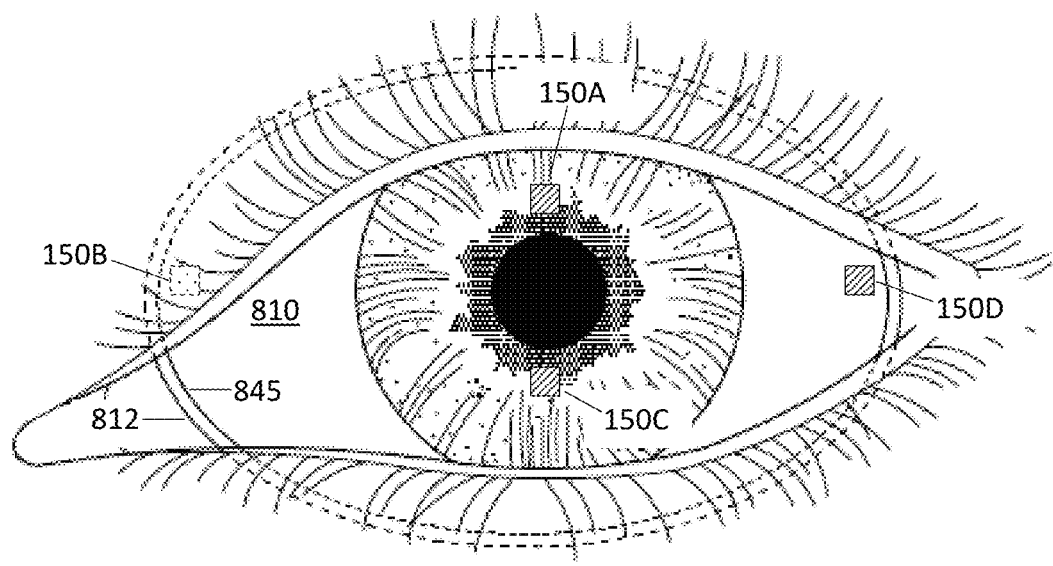
FIG. 8 shows a non-circular contact lens with an accelerometer network.

As a final example, FIG. 8 shows a non-circular contact lens 810 with an accelerometer network. In this example, the perimeter 812 of the contact lens is elongated along the direction of the eye opening. The coil 845 is also elongated. As a result, it encloses a larger area, which increases the power transfer efficiency. As in FIG. 1B, there are four 3-axis accelerometers 150A-D, each represented by a small square. The outlined square 150B is covered by the user's eyelid and is not visible. The hatched squares 150A,C,D are directly visible. The configuration shown is similar to the tetrahedral configuration of FIG. 6. However, two of the 3-axis accelerometers 150B,D are positioned at opposite ends of the major axis of the contact lens to take advantage of the greater separation possible along that axis. Since the eye is curved, these two accelerometers are also lower in height than if they were placed at opposite ends of the minor axis. This increases the height separation between accelerometers, which is one of the challenges of an accelerometer network in a contact lens.

Although the detailed description contains many specifics, these should not be construed as limiting the scope of the invention but merely as illustrating different examples. It should be appreciated that the scope of the disclosure includes other embodiments not discussed in detail above. For example, asymmetric arrangements are also useful. The placement of other components in the contact lens may also influence the arrangement of accelerometers. As another example, the accelerometer network may also include 1-axis accelerometers. In one class of designs, the network includes twelve 1-axis accelerometers arranged in a non-planar geometry and not more than four of the accelerometers measure acceleration along the same direction. Various other modifications, changes and variations which will be apparent to those skilled in the art may be made in the arrangement, operation and details of the method and apparatus disclosed herein without departing from the spirit and scope as defined in the appended claims. Therefore, the scope of the invention should be determined by the appended claims and their legal equivalents.

What is claimed is:

1. An eye tracking system comprising:
    a contact lens; and
    twelve accelerometers contained in the contact lens, the accelerometers measuring accelerations of an eye when the contact lens is mounted on the eye, where the twelve accelerometers are implemented as four 3-axis accelerometers arranged in a non-planar geometry, three of the 3-axis accelerometers are positioned at a radius $r_1$ from a center of the contact lens, and the fourth 3-axis accelerometer is positioned at a smaller radius $r_2 < r_1$.

2. The eye tracking system of claim 1, where the fourth 3-axis accelerometer is positioned in a center of the contact lens.

3. The eye tracking system of claim 1, where the fourth 3-axis accelerometer is positioned at a radius $r_2 > 1$ mm.

4. The eye tracking system of claim 3, where one of the three 3-axis accelerometers at radius $r_1$ is azimuthally positioned 180 degrees away from the fourth 3-axis accelerometer at radius $r_2$, and the other two of the three 3-axis accelerometers at radius $r_1$ are azimuthally positioned at $+\gamma$ degrees and $-\gamma$ degrees away from the fourth 3-axis accelerometer with $\gamma<60$ degrees.

5. The eye tracking system of claim 1, further comprising:
a processor that receives the acceleration measurements and estimates an orientation of the eye relative to an external reference frame; and
where the contact lens further contains a femtoprojector that projects an image onto a retina of the eye, and the estimated orientation is used so that the projected image appears to be at a stationary location relative to an external environment.

6. An eye tracking system comprising:
a contact lens; and
twelve accelerometers contained in the contact lens, the accelerometers measuring accelerations of an eye when the contact lens is mounted on the eye, where the twelve accelerometers are implemented as four 3-axis accelerometers arranged in a non-planar geometry, two of the 3-axis accelerometers are positioned at a radius $r_1$ from a center of the contact lens, and the other two 3-axis accelerometers are positioned at a radius $r_2<r_1$.

7. The eye tracking system of claim 6, where the two 3-axis accelerometers at radius $r_1$ are azimuthally offset by 90 degrees from the two 3-axis accelerometers at radius $r_2$.

8. The eye tracking system of claim 6, where an axis between the two 3-axis accelerometers at radius $r_1$ is oriented vertically in relation to the user's eye.

9. The eye tracking system of claim 6, where the contact lens is a non-circular contact lens characterized by a major axis, and two of the 3-axis accelerometers are positioned at opposite ends of the major axis.

10. The eye tracking system of claim 6, further comprising:
a processor that receives the acceleration measurements and estimates an orientation of the eye relative to an external reference frame; and
where the contact lens further contains a femtoprojector that projects an image onto a retina of the eye, and the estimated orientation is used so that the projected image appears to be at a stationary location relative to an external environment.

11. An eye tracking system comprising:
a contact lens; and
twelve accelerometers contained in the contact lens, the accelerometers measuring accelerations of an eye when the contact lens is mounted on the eye; where the twelve accelerometers are implemented as six 2-axis accelerometers arranged in a non-planar geometry, three of the 2-axis accelerometers are positioned at a radius $r_1$ from a center of the contact lens, and the other three 2-axis accelerometers are positioned at a radius $r_2<r_1$.

12. The eye tracking system of claim 11, further comprising:
a processor that receives the acceleration measurements and estimates an orientation of the eye relative to an external reference frame; and
where the contact lens further contains a femtoprojector that projects an image onto a retina of the eye, and the estimated orientation is used so that the projected image appears to be at a stationary location relative to an external environment.

13. An eye tracking system comprising:
a contact lens; and
twelve accelerometers contained in the contact lens, the accelerometers measuring accelerations of an eye when the contact lens is mounted on the eye; where the twelve accelerometers are implemented as six 2-axis accelerometers arranged in a non-planar geometry, and at least one of the 2-axis accelerometers has at least one axis oriented to measure acceleration along a direction that is not tangential to a curvature of the contact lens.

14. The eye tracking system of claim 13, further comprising:
a processor that receives the acceleration measurements and estimates an orientation of the eye relative to an external reference frame; and
where the contact lens further contains a femtoprojector that projects an image onto a retina of the eye, and the estimated orientation is used so that the projected image appears to be at a stationary location relative to an external environment.

15. An eye tracking system comprising:
a contact lens; and
twelve accelerometers contained in the contact lens, the accelerometers measuring accelerations of an eye when the contact lens is mounted on the eye; where the twelve accelerometers are implemented as six 2-axis accelerometers arranged in a non-planar geometry, the two axes in each of the 2-axis accelerometers define a plane, and no three of the defined planes are all parallel to each other.

16. The eye tracking system of claim 15, further comprising:
a processor that receives the acceleration measurements and estimates an orientation of the eye relative to an external reference frame; and
where the contact lens further contains a femtoprojector that projects an image onto a retina of the eye, and the estimated orientation is used so that the projected image appears to be at a stationary location relative to an external environment.

17. An eye tracking system comprising:
a contact lens; and
twelve accelerometers contained in the contact lens, the accelerometers measuring accelerations of an eye when the contact lens is mounted on the eye; where the twelve accelerometers are implemented as twelve 1-axis accelerometers arranged in a non-planar geometry, and not more than four of the accelerometers measure acceleration along a same direction.

18. The eye tracking system of claim 17, further comprising:
a processor that receives the acceleration measurements and estimates an orientation of the eye relative to an external reference frame; and
where the contact lens further contains a femtoprojector that projects an image onto a retina of the eye, and the estimated orientation is used so that the projected image appears to be at a stationary location relative to an external environment.

19. An eye tracking system comprising:
a contact lens; and
twelve accelerometers contained in the contact lens, the accelerometers measuring accelerations of an eye when the contact lens is mounted on the eye; where the accelerometers consume not more than 5 µW of power at an update rate of 100 Hz.

* * * * *